Nov. 21, 1950        G. C. RAY        2,530,727
PRODUCTION OF CYCLOPENTENE
Filed Jan. 2, 1948
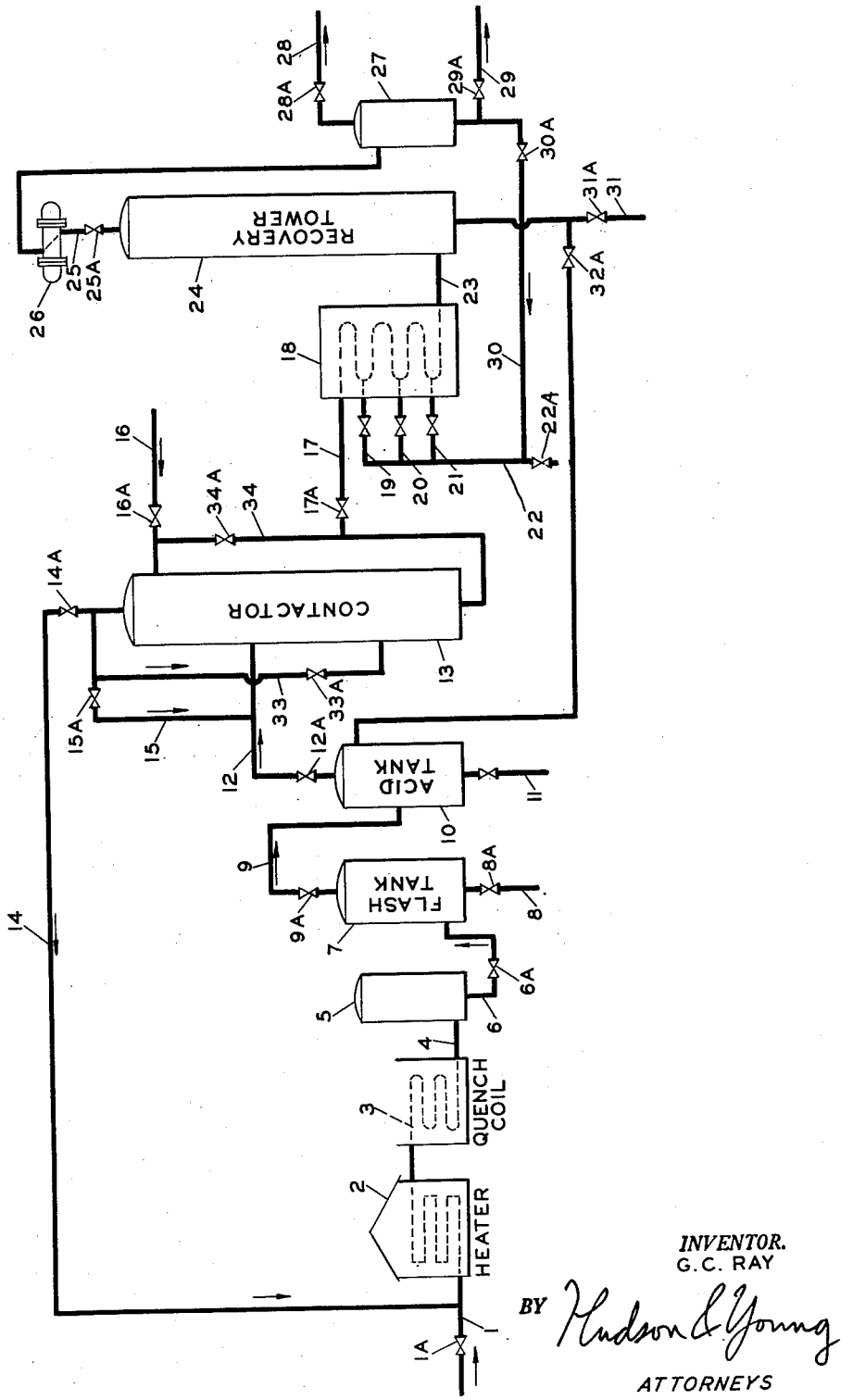
INVENTOR.
G. C. RAY
BY Hudson & Young
ATTORNEYS Patented Nov. 21, 1950

2,530,727

UNITED STATES PATENT OFFICE 2,530,727

PRODUCTION OF CYCLOPENTENE

Gardner C. Ray, Bartlesville, Okla., assignor to Phillips Petroleum Company, a corporation of Delaware Application January 2, 1948, Serial No. 73

4 Claims. (Cl. 260—666)

This invention relates to the manufacture of cyclopentene. In one of its more specific aspects it relates to a process of manufacture of cyclopentene from cyclopentane and its recovery from mixtures with cyclopentane and other hydrocarbons.

Cyclopentene is a valuable hydrocarbon and is useful as a chemical intermediate in the synthesis of a number of organic chemicals used as drugs, explosives, etc. Therefore, a commercial method for its production is eminently desirable.

Cyclopentane is found in naturally occurring petroleum products in appreciable quantities and may be separated in a relatively pure state by fractional distillation. Cyclopentane produced in this manner is a potential source of large quantities of cyclopentene, since cyclopentane upon dehydrogenation under certain conditions gives appreciable yields of cyclopentene.

Such a process is described by H. J. Hepp in United States Patent No. 2,412,936. The process of this patent involves dehydrogenation of cyclopentane in the presence of added hydrogen, or recycle hydrogen containing cyclopentadiene, in vapor phase at a total pressure between about 1 and 10 atmospheres over an active dehydrogenation catalyst at a dehydrogenation temperature of 1000° to 1300° F. A suitable space velocity was used to give a desired extent of conversion.

The dehydrogenation of cyclopentane has been described elsewhere in the literature but no mention of appreciable quantities of cyclopentene in the dehydrogenation effluent has been made; e. g., Z. Physik Chem. 2 289–316, (1929); Ind. Eng. Chem. Anal. Ed. 12, 177 (1940); and Ber. 66, 1415 (1933). The following patents also describe the dehydrogenation of cyclopentane but disclose little as regards yields of cyclopentene: U. S. 2,157,202, U. S. 2,157,203 and U. S. 2,157,939.

One object of my invention is to provide a process for the production and recovery of cyclopentene from cyclopentane.

Another object of my invention is to provide a method and process for separating cyclopentene from mixtures of cyclopentene with cyclopentane and cyclopentadiene.

Another object of my invention is to provide an economical process for separating cyclopentene from cyclopentene-cyclopentane mixtures in which a high recovery of the cyclopentene is realized.

Still other objects and advantages of my invention will be apparent to those skilled in the art upon reading the following description, taken with the attached drawing, which, respectively, describes and illustrates a preferred embodiment of my invention.

The drawing illustrates diagrammatically one form of apparatus in which to carry out the process of my invention.

The above mentioned Patent No. 2,412,936 discloses some catalysts for use in dehydrogenating cyclopentane, among which might be mentioned chromium oxide, chromium oxide-alumina, bauxite, alumina and other metal oxides, alone or supported on catalyst carriers, and with or without promoters.

A preferred catalyst for use in this dehydrogenation reaction is chromic oxide on aluminum oxide, and such a catalyst may be used at temperatures as low as 1000° F. and as high as 1300° F.

When using this preferred catalyst at 1046° F. and a space velocity of 1500 volumes of vapor per volume of catalyst per hour, and a charge of commercially pure cyclopentane, typical conversions of cyclopentane are as follows:

|  | Cyclopentene | Cyclopentadiene | Coke |
|---|---|---|---|
| Single Pass Conversion (wt. per cent of charge) | 8.3 | 4.8 | 3.2 |
| Ultimate yield (wt. per cent) | 47.5 | 27.5 |  |

The conversions will vary with diluents such as steam, hydrogen, and with temperature, pressure and space velocity. This dehydrogenation effluent contains cyclopentadiene and unreacted cyclopentane in addition to cyclopentene.

According to the process of my invention cyclopentadiene may be removed by thermal polymerization to dicyclopentadiene. Cyclopentane and cyclopentene are easily separated from the dicyclopentadiene by distillation. The mixture of cyclopentane and cyclopentene recovered as overhead product from this operation is then treated with sulfuric acid to absorb cyclopentene. Cyclopentane is not absorbed. It may be separated as a separate phase and recycled to the dehydrogenation zone. Cyclopentene may be recovered from the acid phase in a relatively pure state. In the dehydrogenation of cyclopentane feeds containing certain impurities, by-products are produced in the effluent gases which are too close-boiling to cyclopentene to permit the recovery of pure cyclopentene by reasonably efficient fractional distillation. Examples of such impurities are neohexene and piperylenes. In the following disclosure, the separation of cyclopentene from only two impurities (cyclopentane and cyclopentadiene) is described for the sake of simplicity. However, the process of my invention may be suitably applied in cases where there are present neohexene, piperylenes, and other products boiling close to cyclopentene.

I have discovered that cyclopentene can be absorbed in aqueous sulfuric acid without appreciable conversion to by-products. I have found that satisfactory conditions for the absorption are acid concentrations in the range of 60–75 per cent at temperatures in the range of 0° to 30° C. Stronger acid may be used provided temperatures are lowered proportionately. Low temperatures are less desirable since commercial refrigeration is expensive and concentration of the acid for reuse in regions of high concentration is also more expensive. Temperatures about 30° C. tend to produce excessive quantities of polymeric by-products, even with dilute acids.

I prefer to conduct the absorption with 67–73 per cent sulfuric acid at temperatures in the range of 20°–25° C.

Proper dilution of the cyclopentene-containing sulfuric acid for recovery of the cyclopentene is a variable of critical importance, since the quantities of by-products produced vary considerably with variations of sulfuric acid dilution.

If the acid phase is distilled without dilution after absorption of cyclopentene in 70 per cent $H_2SO_4$, almost no cyclopentene is recovered. Much hydrocarbon polymer is produced, accompanied by copious evolution of $SO_2$, produced by reduction of the $H_2SO_4$. If the acid phase is diluted to 5–15 per cent and distilled, large quantities of cyclopentanol are recovered overhead with only minor porportions of cyclopentene. If the acid phase is diluted to 30–40 per cent after absorption of cyclopentene in 70 per cent $H_2SO_4$ and distilled, excellent recovery of cyclopentene is obtained, with only minor quantities of cyclopentanol and polymeric products being produced.

Contacting of the aqueous sulfuric acid with cyclopentene-cyclopentane mixtures may be conducted in a number of ways, such as for example, autoclaves fitted with mechanical agitators, or towers fitted with contact elements such as bubble plates, baffles, sprays, packing, etc. I prefer to use a tower fitted with bubble plates or packing in which the sulfuric acid is contacted with the hydrocarbon mixture by countercurrent flow. Suitable provision should be made, as by water cooling jackets or other means, to remove heat from the absorption zone of the autoclave or tower used for absorption of the cyclopentene in the sulfuric acid. This is necessary since the absorption of cyclopentene in sulfuric acid is exothermic.

The rate of cyclopentene absorption, and hence the quantity of cyclopentene absorbed, from a cyclopentane-cyclopentene mixture in a once-through operation in a tower or autoclave such as those mentioned above will be influenced by a number of variables. Some of these are: concentration of the olefin in the olefin-paraffin mixture, ratio of acid to olefin, presence of certain absorption catalysts, effectiveness of mechanical contacting, concentration of the acid, temperature and other variables. Suitable contact time should be provided in the tower or autoclave to obtain the desired per pass removal of cyclopentene from the cyclopentene-cyclopentane mixture.

The following tabulation shows the absorption of cyclopentene in sulfuric acid as a function of time of contact under the conditions given:

TABLE I

*Absorption of cyclopentene from cyclopentene-cyclopentane mixtures at 70°–75° F. with two volumes of 70 per cent $H_2SO_4$ per volume of olefin*

| Per Cent Olefin in Charge Minutes | 73 | 52 | 19 |
|---|---|---|---|
| | Cumulative per cent of the olefin absorbed | | |
| 20 | 46 | 29 | 3 |
| 40 | 71 | 52 | 11 |
| 60 | 79 | 61 | 16 |
| 100 | 86 | 71 | 25 |
| 150 | 89 | 75 | 35 |
| 300 | 92 | 81 | ------ |

The process of my invention will be better understood upon reference to the figure, which is a schematic arrangement of apparatus parts in which to practice the method of my invention.

Cyclopentane is fed through a line 1 controlled by a valve 1A into a dehydrogenation furnace 2. The dehydrogenation effluent from this furnace is led into some quench coils 3 and thence through a line 4 to a tank 5. Tank 5 is operated at suitable temperature and pressure to dimerize the cyclopentadiene present in the dehydrogenation effluent; for example, it is held at 212° F. for 15 to 20 hours. After allowing suitable residence time, the contents of tank 5 are led through a line 6 controlled by a valve 6A to a flash tank 7 in which the $C_5$'s are flashed overhead, and the dicyclopentadiene is removed by a line 8 controlled by a valve 8A. The flashing operation is conducted at suitable pressure while maintaining a kettle temperature below 200° F. to prevent depolymerization of the dicyclopentadiene. The overhead product from the flash tank 7 comprising cyclopentane, cyclopentene, and traces of cyclopentadiene is conducted to a wash tank 10 by way of a line 9 controlled by a valve 9A. In the wash tank 10, traces of cyclopentadiene are removed by polymerization with spent sulfuric acid recycled from the cyclopentene recovery unit, to be described hereinbelow. In some cases, particularly when only small amounts of cyclopentadiene are present, tanks 5 and 7 may be omitted and substantially all the cyclopentadiene may be removed by the spent acid.

Spent acid and polymers are withdrawn from tank 10 through a line 11 for such disposal as desired. Cyclopentane and cyclopentene free from cyclopentadiene are removed from tank 10 through a line 12 controlled by a valve 12A and fed into a bubble-tray type tower 13 wherein this stream is contacted with some 70 per cent sulfuric acid. From the top of tower 13, cyclopentane containing small quantities of olefin is removed and recycled to the dehydrogenation zone through a line 14 controlled by a valve 14A. A portion of this overhead product may be recycled by a line 15 controlled by a valve 15A to the feed plate of tower 13 or below the feed plate by a line 33, controlled by a valve 33A for again contacting the 70 per cent acid if further olefin removal is desired. Fresh 70 per cent acid is added to tower 13 through a line 16 controlled by valve 16A.

From the bottom of the absorption tower 13, the acid phase is withdrawn through a line 17 controlled by a valve 17A and passed into some cooling coils 18. In these cooling coils water is added by multipoint injection through some lines 19, 20, and 21. Makeup water is brought in through lines 30 and 22 controlled by valves 30A and 22A, respectively. Water is added in such amount that the effluent from the cooling coils 18 contains about 30–40 per cent $H_2SO_4$. A portion of the acid phase from the bottom of tower 13 may be recycled by way of a line 34, controlled by a valve 34A, to the fresh 70 per cent $H_2SO_4$ feed line for again contacting fresh cyclopentene-cyclopentane feed in tower 13.

After addition of the water to the cyclopentene-containing acid in the coils 18, the acid remains a single homogeneous liquid phase.

This phase is led through a line 23 into a cyclopentene recovery tower 24, in which the acid phase is distilled, taking overhead cyclopentene and water, while withdrawing a kettle product of dilute sulfuric acid. The overhead product is passed through a line 25 controlled by a valve 25A to a condenser 26 and thence to a separator 27. Cyclopentene containing traces of cyclopentanol is withdrawn from the top of the separator through a line 28 controlled by a valve 28A. If desired, the cyclopentene may be redistilled in means not shown to remove the traces of cyclopentanol. The lower phase from the separator 27 containing water and traces of cyclopentanol may be discarded through a line 29 controlled by a valve 29A or recycled through a line 30 controlled by a valve 30A to the makeup water line 22. Aqueous sulfuric acid kettle product from the distillation unit 24 may be discarded through a line 31 controlled by valve 31A, or it may be concentrated in apparatus, not shown, and recycled to the extraction tower 13. A portion of this kettle product is recycled by a line 32 controlled by a valve 32A for removing traces of cyclopentadiene in the wash tank 10.

To illustrate specifically the removal and recovery of cyclopentene from cyclopentene-cyclopentane mixtures with sulfuric acid the following specific examples are given.

EXAMPLE I

A mixture of 100 cc. of cyclopentane and 100 cc. of cyclopentene was charged to a flask fitted with a mechanical stirrer and a reflux condenser cooled with ice water. Seventy per cent aqueous sulfuric acid was added over a period of 30 minutes while maintaining a temperature of 70–75° F. A total of 400 cc. of acid was used. Stirring was continued for an additional time of about two hours. At the end of this time, an acid phase separated from a hydrocarbon phase. The upper phase (153 cc.), on analysis, was found to contain 65 per cent cyclopentane and 35 per cent cyclopentene. Only a trace of cyclopentanol was present in this phase. Hence, 46 cc. of the initial cyclopentene charged was absorbed in the acid.

The lower (acid) phase was distilled without dilution. Only five cc. of hydrocarbon distillate was recovered. Large quantities of $SO_2$ were evolved, and much polymeric material was produced during this distillation. The formation of this polymeric material indicates the need for proper dilution of the sulfuric acid for recovery of the absorbed cyclopentene.

EXAMPLE II

Example I was repeated except that the acid phase was diluted with water to 35 per cent acid prior to distillation and a longer stirring time was used after the acid addition. Data from this experiment are:

| | Cc. |
|---|---|
| Cyclopentene absorbed | 68 |
| Composition of upper phase: | |
| Cyclopentene | 32 |
| Cyclopentanol | 2 |
| Cyclopentane | 99 |

Upon dilution of the acid phase to 35 per cent and distillation, there was recovered 53 cc. of cyclopentene and 4 cc. of cyclopentanol. The 53 cc. of cyclopentene recovered presents a 78 per cent recovery of the cyclopentene absorbed.

This experiment illustrates that absorption of cyclopentene in 70 per cent $H_2SO_4$ followed by dilution to 35 per cent and distillation gives excellent recovery of this olefin with only small quantities of by-products.

EXAMPLE III

Example I was repeated except that dilution of the acid phase to 10 per cent was made prior to distillation to liberate the cyclopentene.

In this experiment 50 cc. of cyclopentene was absorbed. The composition of the upper phase was:

| | Cc. |
|---|---|
| Cyclopentane | 92 |
| Cyclopentene | 50 |
| Cyclopentanol | 3 |

The lower (acid) phase after dilution and distillation yielded 11 cc. of cyclopentene and 18 cc. of cyclopentanol. It will be seen that large quantities of by-product cyclopentanol were produced in this experiment with relatively poor recovery of cyclopentene.

The apparatus used in the catalytic dehydrogenation step may be of the type and of such material of construction as ordinarily used in such systems. The equipment for use in the extraction and cyclopentene recovery part of the system must be resistant to the action of sulfuric acid of the dilution disclosed; otherwise, it may be constructed of materials commercially available.

Flow controls, pumps, regulators and like auxiliary apparatus are not shown in the drawing nor described in the specification, since the need and use of such apparatus is well known in the art.

While I have described an illustrative embodiment in the specification, drawing and examples, it is to be understood that such is merely to enable an understanding of the invention, the scope of which is set forth in the following claims.

Having disclosed my invention, I claim:

1. A process for the separation and recovery of cyclopentene from a mixture of cyclopentene and cyclopentane comprising the steps of contacting said mixture of cyclopentene and cyclopentane with sulfuric acid of 60 to 75% concentration, separating an acid phase from a hydrocarbon phase, diluting the acid phase with sufficient water to lower the concentration of sulfuric acid therein to 30 to 40 per cent and distilling the diluted acid to recover cyclopentene.

2. A process for the separation and recovery of cyclopentene from a mixture of cyclopentene, cyclopentane and other close-boiling hydrocarbons comprising the steps of contacting said mixture of hydrocarbons with sulfuric acid of 60 to 75 per cent concentration at a temperature from 0° to 30° C., separating an acid phase from a hydrocarbon phase, diluting the acid phase with sufficient water to lower the acid concentration to 30 to 40 per cent, and distilling the diluted acid phase to recover the cyclopentene.

3. A process for the separation and recovery of cyclopentene from a mixture of hydrocarbons containing cyclopentene, cyclopentane, cyclopentadiene and some other hydrocarbons having boiling points near the boiling points of these cyclo compounds comprising the steps of heating said mixture of hydrocarbons at such a temperature for 15 to 20 hours to polymerize at least a portion of the cyclopentadiene to a dimer, flashing the unpolymerized cyclopentadiene and other hydrocarbons from the dimer, contacting the flashed material with an aqueous sulfuric acid subsequently produced to remove final traces of cyclopentadiene and separating the so contacted flashed material from said aqueous acid contacting step, treating the separated dilute acid treated material with sulfuric acid of 60 to 75 per cent concentration at a temperature of 0° to 30° C., separating a hydrocarbon phase from an acid phase, diluting this latter acid phase with sufficient water to lower the acid concentration to 30 to 40 per cent, distilling this diluted acid and recovering the cyclopentene from the distillate as the product of the process, and recycling a portion of the acid bottoms as said aqueous sulfuric acid subsequently produced.

4. The process of claim 3 wherein the polymerization step is carried out at 212° F.

GARDNER C. RAY.

REFERENCES CITED

The following references are of record in the file of this patent:

UNITED STATES PATENTS

| Number | Name | Date |
|---|---|---|
| 2,007,160 | Engs et al. | July 9, 1935 |
| 2,128,971 | Snow | Sept. 6, 1938 |
| 2,412,936 | Hepp | Dec. 17, 1946 |

OTHER REFERENCES

Wilson et al.: Reprint from Chem. Rev. 34, pages 4 and 5 (1944).